UNITED STATES PATENT OFFICE.

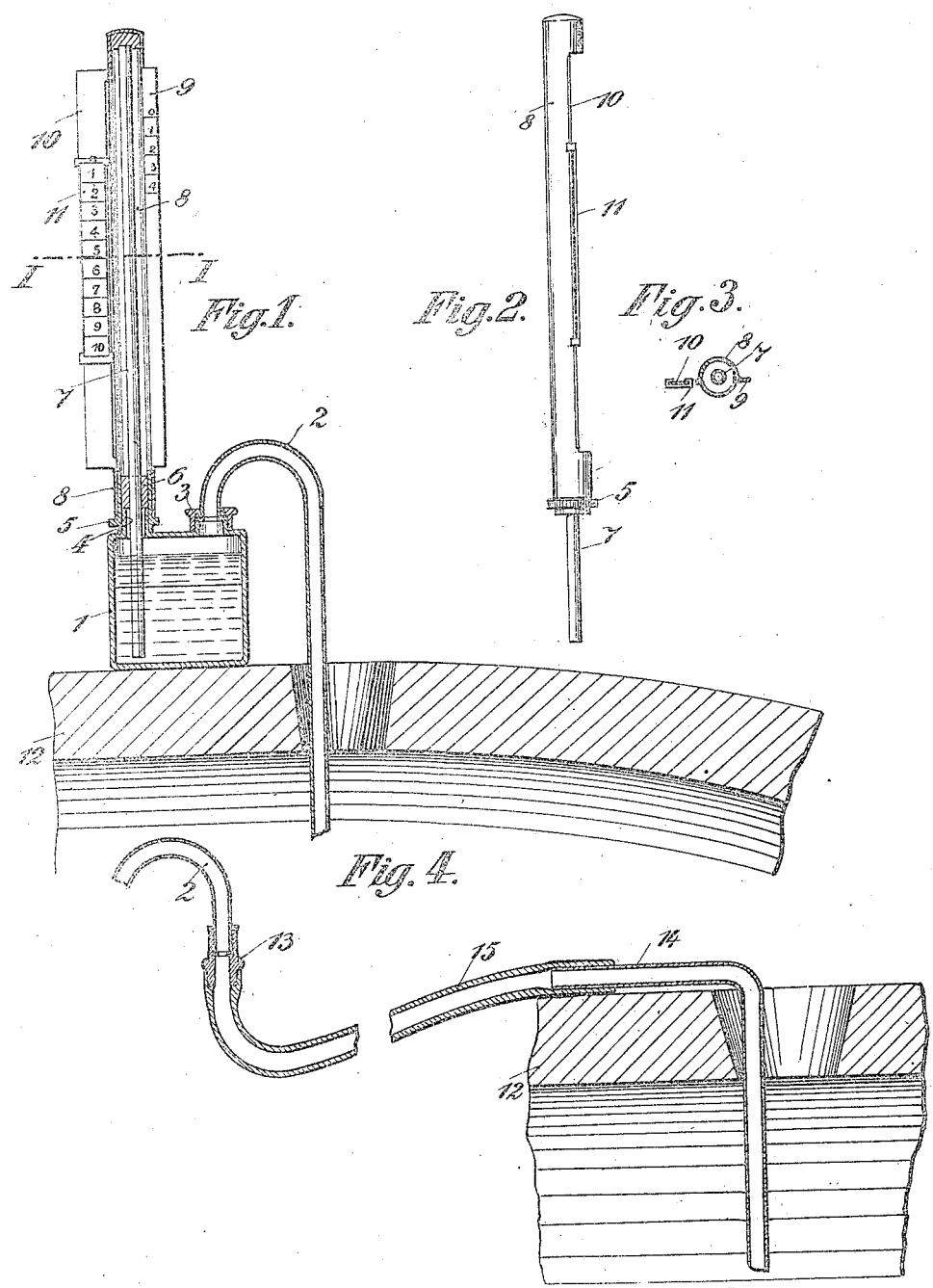

GUSTAV SCHOLLMEYER, OF KÖTHEN, GERMANY.

CONTROLLING DEVICE FOR FILLING VESSELS.

942,755.

Specification of Letters Patent.

Patented Dec. 7, 1909.

Application filed February 4, 1909. Serial No. 476,100.

*To all whom it may concern:*

Be it known that I, GUSTAV SCHOLLMEYER, a subject of the German Emperor, and resident of 15, Aribertstrasse, Köthen, Anhalt, Germany, have invented certain new and useful Improvements in Controlling Devices for Filling Vessels, of which the following is a specification.

My invention relates to a device for ascertaining to what extent a vessel has been filled in the case of vessels in which the rising of the fluid cannot be observed from the outside, in order to prevent the overflowing of the vessel.

My invention is based on the principle of producing an increased air-pressure in a closed receptacle partly filled with a fluid by the rising of the fluid in the vessel to be filled, by which air-pressure the fluid in this receptacle is pressed upward in a rising-pipe provided with a scale.

In order to facilitate the understanding of my invention, reference has been made in the specification to the accompanying drawing which illustrates one form of construction.

Figure 1 shows a device in a vertical section together with the vessel to be filled. Fig. 2 is a side view of the rising-pipe and a protecting cover. Fig. 3 is a section on the line I—I of Fig. 1. Fig. 4 is a section of a part of a modified form of my invention.

As shown in Figs. 1–3, the device consists of a perfectly closed receptacle 1 of required size, which is nearly entirely filled with a fluid. On this receptacle 1 is air-tightly fastened by means of a screw-cap 3 a downwardly leading tube 2. Upon a socket 4 on the receptacle 1 is screwed a short tube 5, into which is air-tightly inserted, by means of a rubber stopper 6 or the like a rising-pipe 7. The lower end of this rising-pipe reaches nearly down to the bottom of the receptacle 1. The rising-pipe 7 of glass or any other transparent material is, for the purpose of protecting it, surrounded with a partly open tube 8 arranged on the tube 5 in a manner that it can be turned. This protecting cover 8 shows two projections or wings 9, 10, of which the wing 9 carries a rigidly fixed inch-scale, for the purpose mentioned farther on. On the wing 10 is arranged a vertically shiftable scale 11, likewise with an inch-division.

For using the device in filling a vessel, for instance, a cask or barrel, the device is put upon the cask 12 in the manner shown in Fig. 1, so that the tube 2 reaches down through the bung-hole into the interior of the cask. When the fluid rises in the cask 12 and when it reaches a certain height depending on the length of the tube 2, the fluid closes the lower end of this tube. If the fluid continues to rise, the air in the tube 2 is compressed, whereby there is produced an increased pressure in the air-space of the receptacle 1. By this increased pressure the fluid in this receptacle, preferably colored, is caused to rise in the rising-pipe 7. On the scale 11 can then be read how many inches, or what part of an inch, of empty space there is still left in the vessel to be filled. Filling the vessel too high, so that it flows over, can therefore with certainty be prevented. The thickness of the walls of the vessels to be filled requires, of course, also to be taken into consideration. For this purpose the fixed scale is arranged on the wing 9. Before the filling commences, the shiftable scale 11 is adjusted in a manner that the zero-point of the same is on a level with the division of the fixed scale corresponding to the thickness of the wall of the vessel to be filled.

In order to be able to arrange the device at some distance from the vessel to be filled, as is desirable when filling vessels with acids, in order to protect the device against the noxious vapors emanating from the acids, in the form of construction shown in Fig. 4, the tube 2 is considerably shorter than in the construction shown in Fig. 1, and by means of a screwing device 13 a flexible tube 15 can be fastened on the tube 2 with whose other end is connected a rectangularly bent tube 14, which is introduced into the vessel 12 to be filled. The tube 14 is held in position by its bent end resting on the wall of the vessel. The described arrangement may be preferably used when filling vessels by means of a funnel.

In the arrangement shown in Fig. 4 the single parts of the conduit can be easily cleaned which is especially of importance in the case of delicate liquids, such as wine and so on.

The device according to my invention can be easily transported and be used for all purposes of this kind.

What I claim as my invention and desire to secure by Letters Patent is:—

1. A controlling device for filling vessels comprising the combination of a closed receptacle containing a fluid and adapted to be placed on the vessel to be filled, a tube detachably connected with the said receptacle and adapted to be introduced into the vessel to be filled, a socket on said receptacle, an indicating pipe air-tightly inserted into said socket and having its lower end dipping into the fluid contained in said receptacle, a protecting cover turnably arranged on said socket and partly surrounding the said indicating pipe, two lateral projections on said protecting cover, a scale being provided on one of said lateral projections and adapted to indicate the thickness of the wall of the vessel to be filled, and a part provided with a scale and shiftable on the other of said two lateral projections and adapted to indicate the height of the empty space of the vessel to be filled, substantially as and for the purpose set forth.

2. A controlling device for filling vessels comprising the combination of a closed receptacle containing a fluid and adapted to be placed on the vessel to be filled, a bent tube detachably connected with the said receptacle, a flexible tube removably attached to said bent tube, and a rectangular bent tube connected with the said flexible tube and adapted to be inserted into the vessel to be filled, a socket on said receptacle, an indicating pipe air-tightly inserted into said socket and having its lower end dipping into the fluid contained in said receptacle, a protecting cover turnably arranged on said socket and partly surrounding the said indicating pipe, two lateral projections on said protecting cover, a scale being provided on one of said lateral projections and adapted to indicate the thickness of the wall of the vessel to be filled, and a part provided with a scale and shiftable on the other of said two lateral projections and adapted to indicate the height of the empty space of the vessel to be filled, substantially as and for the purpose set forth.

In testimony whereof I have hereunto signed my name this 21st day of January 1909, in the presence of two subscribing witnesses.

GUSTAV SCHOLLMEYER.

Witnesses:
HENRY HASPER,
WOLDEMAR HAUPT.